Patented July 29, 1952

2,605,268

UNITED STATES PATENT OFFICE 2,605,268

ALPHA-AMINO-GAMMA-LACTONES

Curt Schuster, Ludwigshafen-on-the-Rhine, Germany

No Drawing. Application October 26, 1949, Serial No. 123,783. In Germany November 9, 1948

2 Claims. (Cl. 260—344)

1

This invention relates to α-amino-γ-lactones, in particular to α-amino-γ-butyrolactones, and a method of their production.

I have found that α-amino-γ-lactones having the general formula

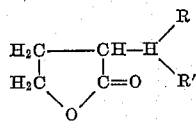

may be obtained by reacting α-halogenobutyrolactones in the presence of agents capable of binding hydrogen halide with secondary amines of the general formula R—NHR', wherein R and R' may be similar or different aliphatic, aromatic, araliphatic, cycloaliphatic or heterocyclic groups as well as joint members of a ring system. Secondary amines suitable for use in the practice of my invention are, for instance, dimethylamine, diethylamine, di-propylamine, dihexylamine, methylethylamine, ethyldodecylamine, methylaniline, diphenylamine, methylaminopyridine and also polymethylene imines, such as pyrrolidine, or piperidine.

As examples of agents capable of binding hydrogen halide I may mention alkali metal carbonates, such as sodium carbonate or tertiary organic bases, such as pyridine or dimethylaniline. The most efficient way of carrying out the process according to my invention is by using the secondary amine to be reacted in an excess sufficient to bind the hydrogen halide.

The reaction is carried out by heating the mixture of the reactants to about 100–150° C. with or without addition of an inert solvent or diluent and, if required, in a pressure-tight vessel, while stirring.

It has already been known that butyrolactones which contain no halogen are converted into the amides of γ-hydroxy- or γ-aminobutyric acid when reacted with primary or secondary amines. It, therefore, was not to be expected by those skilled in the art that by reacting α-halogenobutyrolactones with secondary amines the lactone ring would remain unaffected, the reaction consisting substantially in the substitution of the halogen by the amino group.

The α-amino-γ-lactones which may be prepared, with a good yield, according to the process of my invention, are soluble in dilute acids and also, at an elevated temperature, in alkaline liquors, in this latter case the ring being opened up. The ring may be re-closed by acidulating the alkaline solution containing the alkali metal salt of the α-amino-γ-hydroxybutyric acid.

The products obtainable by the aforesaid process are valuable intermediates, for instance for the manufacture of dyestuffs and auxiliary products for the textile industry.

2

The following examples serve to illustrate the nature of my invention and how the same may be carried out in practice, but the invention is not restricted to these examples. The parts are parts by weight, unless otherwise stated.

Example 1

420 parts of α-chlorobutyrolactone are heated with 700 parts (by volume) of a 50 per cent aqueous solution of dimethylamine to 130° C. for 8 hours, in an autoclave. The solution is treated with charcoal, filtered and concentrated under reduced pressure. The dimethylamine hydrochloride which deposits in a crystalline form is removed by centrifugation. The sirupy filtrate substantially consists of α-dimethylaminobutyrolactone. Its picrate melts at 162° C.

Example 2

A mixture of 121 parts of N-monoethylaniline and 85 parts of α-bromobutyrolactone is heated to 110° C. in a stirring vessel for 4 hours. On cooling the mixture solidifies to a crystal pulp. This is stirred with ether, after which the non-dissolved monoethylaniline hydrobromide is filtered off. From the filtrate the ether is removed by evaporation and then a small amount of unreacted ethylaniline and α-bromobutyrolactone is distilled off under reduced pressure. The α-(ethylphenylamino)-butyrolactone remains as a tough oil which distils at between 173°–175° C. under a pressure of 3 millimeters (mercury gauge). It dissolves in acids already in the cold and in dilute caustic soda solution upon heating.

What I claim is:

1. The method of producing α-(ethylphenylamino)butyrolactone which comprises reacting a member of the group consisting of α-chloro- and α-bromobutyrolactone with an excess of ethylaniline sufficient to substitute the halogen atom and to bind the hydrogen halide set free by said substitution.

2. α-(ethylphenylamino)butyrolactone.

CURT SCHUSTER.

REFERENCES CITED

The following references are of record in the file of this patent:

UNITED STATES PATENTS

| Number | Name | Date |
|---|---|---|
| 2,421,729 | Walton | June 3, 1947 |

OTHER REFERENCES

Livak: J. Amer. Chem. Soc., vol. 67, pp. 2218–2220 (1945).

Armstrong: J. Amer. Chem. Soc., vol. 70, pp. 1756–1759, May 1948.